United States Patent [19]

Trees

[11] 4,164,296
[45] Aug. 14, 1979

[54] APPARATUS FOR TRANSFERRING AND ROTATING ARTICLES

[75] Inventor: Carl I. Trees, Moscow, Ohio

[73] Assignee: The Lodge & Shipley Company, Cincinnati, Ohio

[21] Appl. No.: 795,814

[22] Filed: May 11, 1977

[51] Int. Cl.² ............................................. B65G 47/91
[52] U.S. Cl. ..................................... 414/416; 198/426; 414/590; 414/744
[58] Field of Search ................ 214/1 R, 1 BB, 1 BT, 214/1 BD, 1 BV, 1 BC, 1 BH, 1-77, 6 A, 8.5 C, 8.5 D, 309, 152; 198/379, 426

[56] References Cited

U.S. PATENT DOCUMENTS

| 3,487,959 | 1/1970 | Pearne et al. | 214/8.5 C |
| 3,934,920 | 1/1976 | Rowekamp | 214/309 X |
| 3,939,993 | 2/1976 | Lingl, Jr. | 214/8.5 C X |
| 4,032,022 | 6/1977 | Smith | 214/8.5 C |

Primary Examiner—Frank E. Werner
Attorney, Agent, or Firm—Wood, Herron & Evans

[57] ABSTRACT

Apparatus for transferring articles from the first station to a second station wherein the articles are rotated through 90° as they are transferred. The apparatus includes plural lifting heads, each lifting head having two plates carrying depending gripping devices for grasping a pattern of articles and transferring them from the first station to the second station. During the transfer, the plates are spread apart to split the pattern in half and the plates are rotated through an angle of 90° before the articles are deposited at the second station.

2 Claims, 9 Drawing Figures

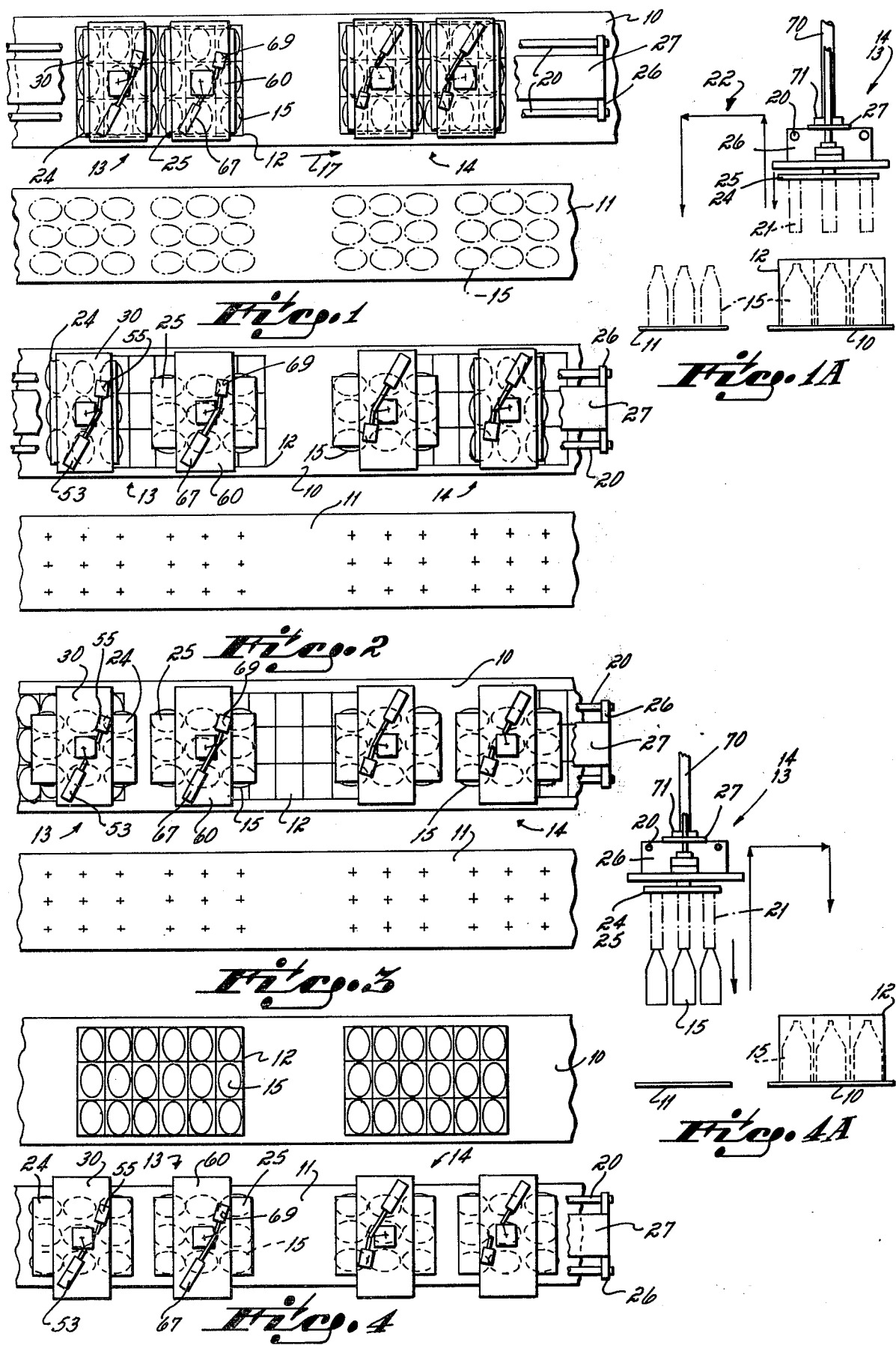

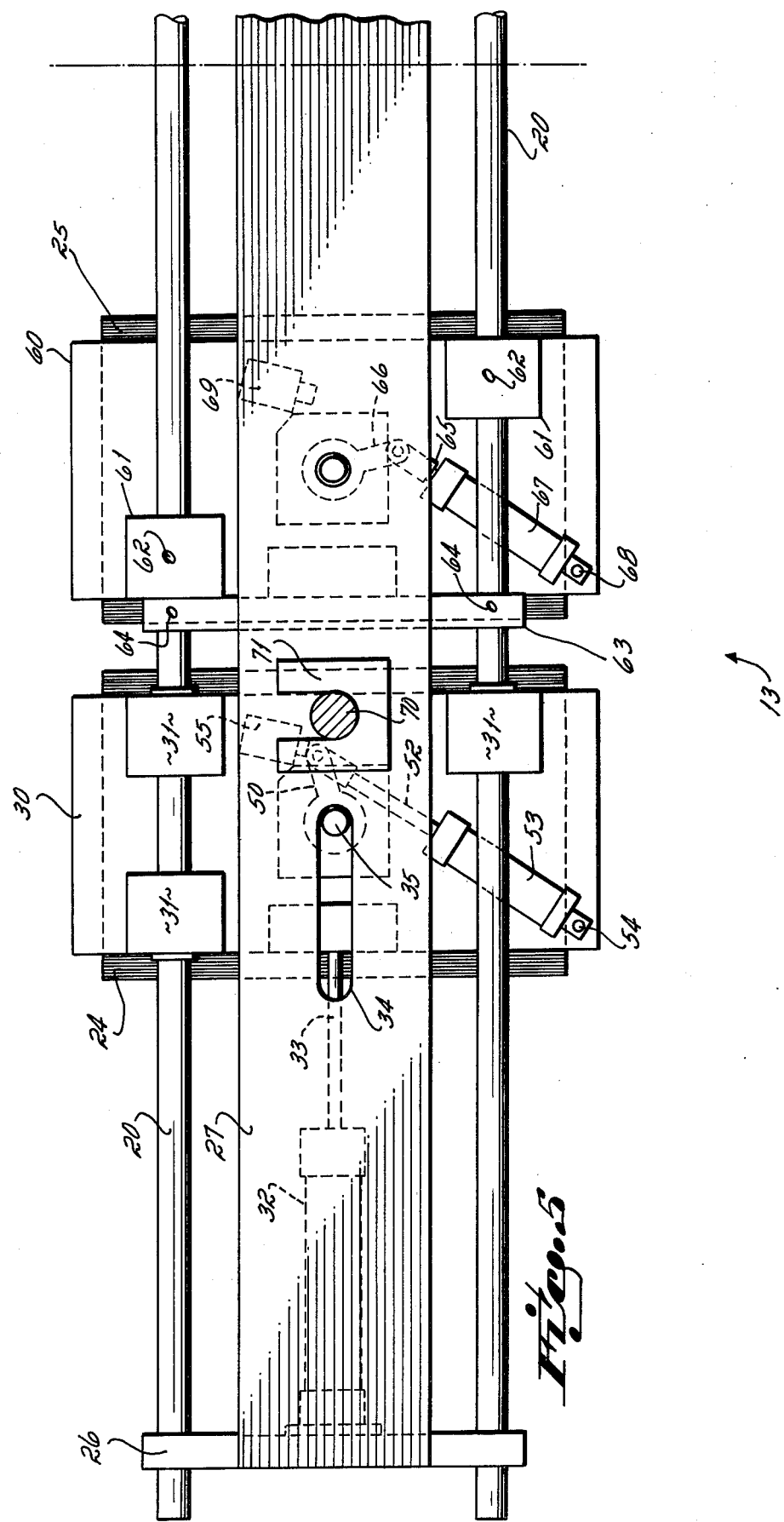

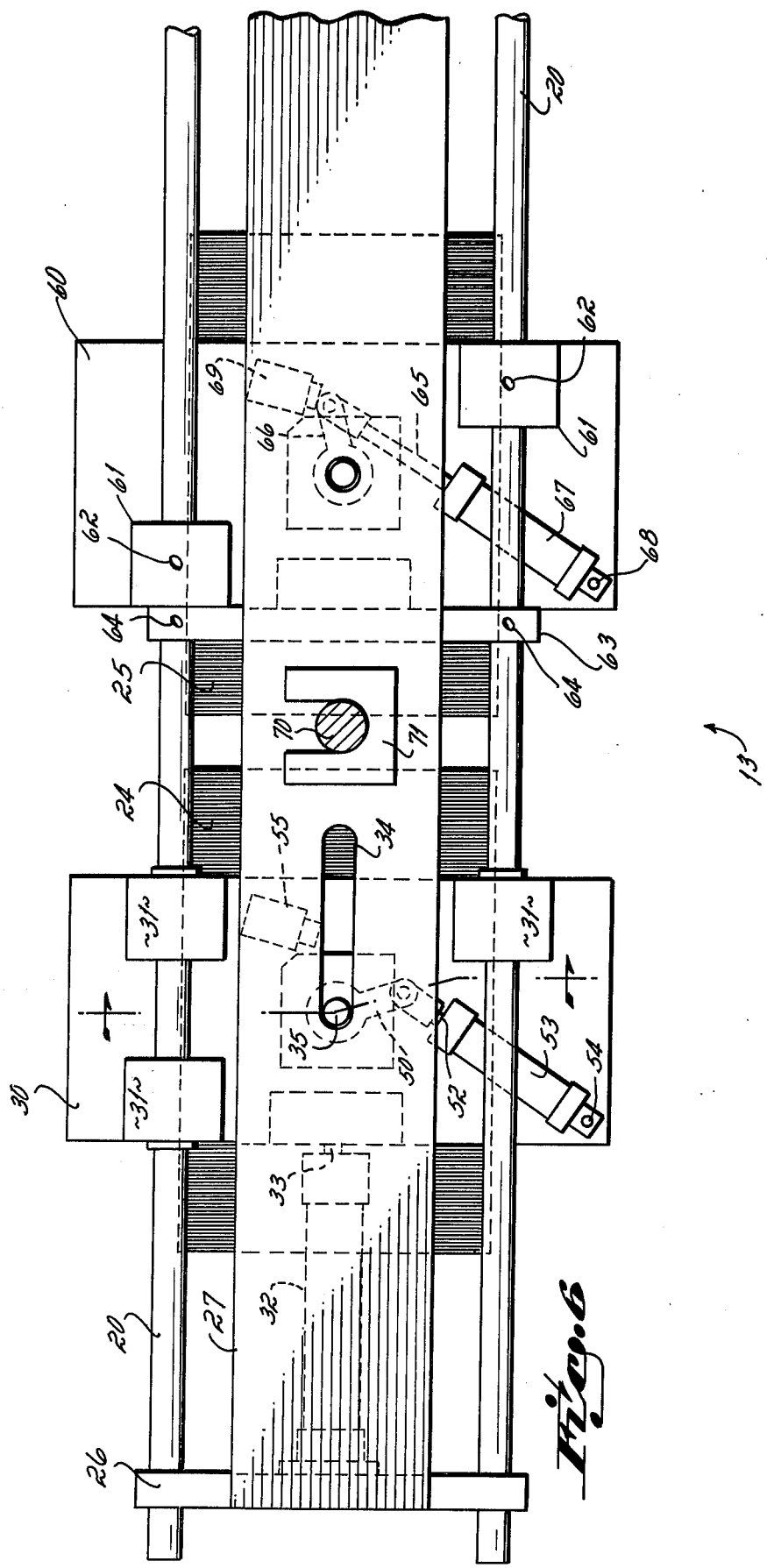

APPARATUS FOR TRANSFERRING AND ROTATING ARTICLES

This invention relates to apparatus for handling articles, and specifically the invention relates to apparatus for moving articles between first and second stations during which the articles are rotated through 90°.

For the sake of clarity the description hereinafter set forth will be in relation to a bottle uncaser wherein a pattern of bottles is removed from a single case and deposited on a conveyor for further processing, the orientation of the bottles having rotated through 90° during the transfer. It will be obvious that the invention has other applications wherein articles including bottles are transferred from one station to another and rotated through 90°.

The problem to which the present invention is addressed involves bottles which have a non-round, for example, oval shape, cross-section. In bottle handling apparatus of the type shown in U.S. Pat. No. 3,555,770, for example, cases containing a pattern of bottles, such as a 3×6 pattern with the oval shaped bottles, have a major axis oriented perpendicularly to the movement of the cases into the transfer apparatus. A lifting head carries a 3×6 pattern of gripping devices into each case, grips the bottles, lifts the bottles and transfers them onto a conveyor running parallel to the case conveyor on the opposite side of the transfer apparatus. Without any rotation, the bottles would have their major axes oriented perpendicularly to the direction of movement of the conveyor onto which they are deposited. However, for further processing it is desired to have the major axes of the bottles oriented parallel to the direction of movement of the conveyor.

It has been proposed to provide apparatus of the type described with means for rotating each lifting head through an angle of 90° during the transfer from case to bottle conveyor. This approach, however, is unsatisfactory since for a 3×6 pattern of bottles the rotation would require the conveyor to receive six lanes of bottles for further processing, and normally six lanes of bottles is unsuitable for the downstream processing equipment.

An objective of the present invention has been to provide apparatus for transferring long patterns of bottles, rotating the bottles through 90° and depositing them in a pattern requiring relatively few lanes in the bottle conveyor.

The objective of the present invention is achieved by providing a transfer apparatus wherein each lifting head consists of two plates carrying depending gripping devices. Means are provided for splitting the plates apart after the bottles have been gripped and lifted and thereafter rotating the plates through 90° to change the orientation of the bottles.

With the apparatus of the present invention it is possible to uncase a pattern of 3×6 bottles with bottle axes oriented transversely to the length of the case and deposit the bottles on the bottle conveyor into three files of bottles with the axes of the bottles oriented longitudinally or parallel to the direction of the bottle conveyor.

More specifically, provision is made for splitting the lifting plates apart, rotating a first plate through 90°, then rotating a second plate through 90°, the splitting of the plates and the two stage rotation all occurring as the plates are carried across the span from the case conveyor to the bottle conveyor. The two-step rotation is desired in order to reduce the distance by which the plates must be split apart in order to effect rotation.

The several features and objectives of the invention will become more readily apparent from the following detailed description taken in conjunction with the accompanying drawings in which:

FIG. 1 is a diagrammatic top plan view illustrating the apparatus prior to transfer;

FIG. 1A is a diagrammatic end elevational view of the apparatus of FIG. 1;

FIG. 2 is a diagrammatic top plan view of the apparatus of FIG. 1 in which the plates are spread apart and one plate of each set is rotated through 90°.

FIG. 3 is a diagrammatic top plan view of the apparatus of FIG. 1 in which both plates of each set are rotated through 90°.

FIG. 4 is a diagrammatic top plan view of the apparatus of FIG. 1 in which the plates have been shifted from the case conveyor to the bottle conveyor and are in position to deposit the bottles on the bottle conveyor.

FIG. 4A is an end elevational view of the apparatus of FIG. 4;

FIG. 5 is a top plan view of one lifting head;

FIG. 6 is a top plan view of a lifting head of FIG. 5 showing the lifting plates spread apart and rotated.

Figure 7:
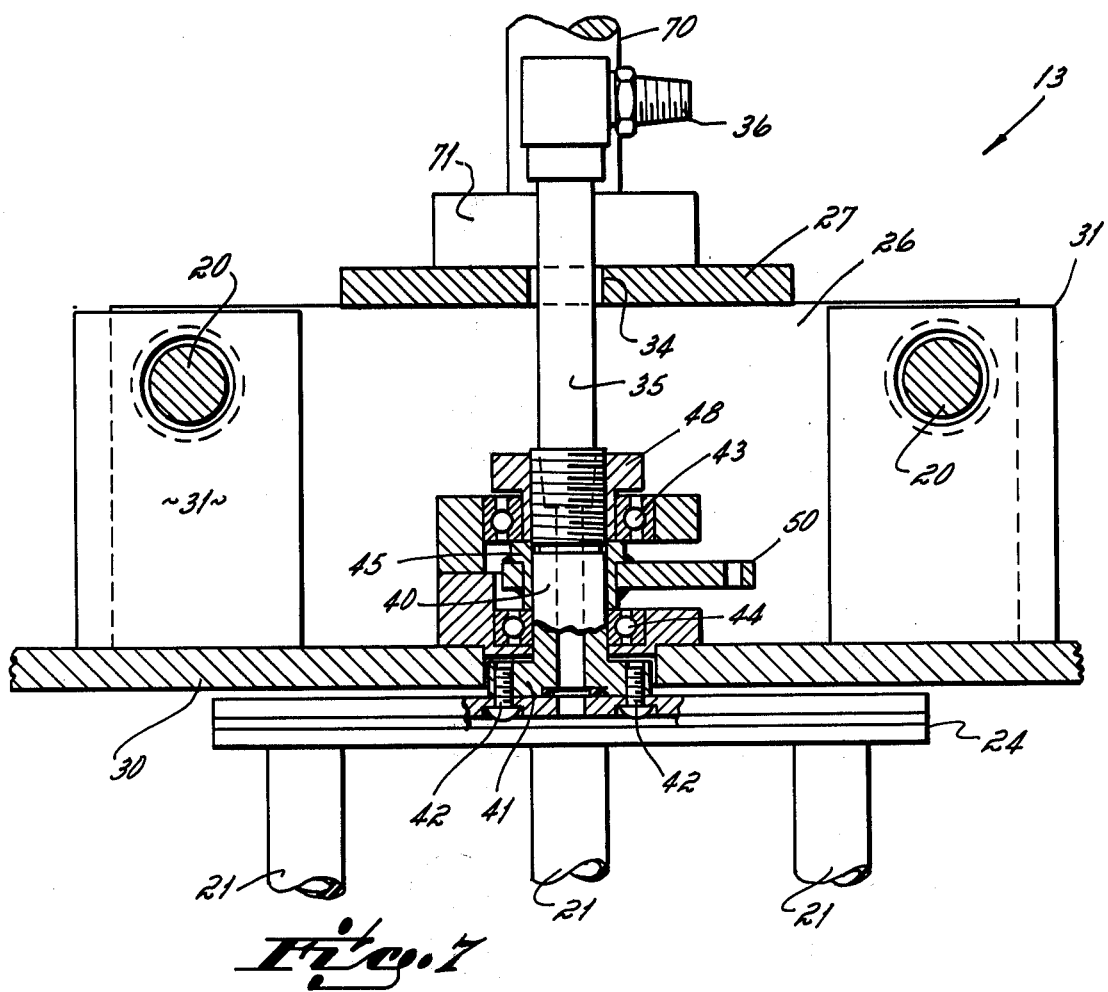
FIG. 7 is a cross-sectional view of one lifting plate and associated apparatus taken along lines 7—7 of FIG. 6.

Referring to FIGS. 1 through 4A, the apparatus includes a case conveyor 10, a bottle conveyor 11 located alongside the case conveyor 10 and running parallel thereto. The case conveyor 10 has means for carrying cases 12 and indexing them into position wherein they are momentarily held beneath lifting heads 13, 14 of the transfer apparatus. Each case contains a pattern of bottles 15, a representative pattern of 3×6, that is, three files and six rows being shown. It can be seen that the bottles are oval shaped and have a major axis which is oriented perpendicularly to the movement of the cases as indicated by the arrow 17. The transfer apparatus will lift thusly oriented bottles from the cases and deposit them on the bottle conveyor 11 with the bottles oriented with their major axes parallel to the direction of movement of the bottle conveyor, that is, rotated through an angle of 90° from their orientation in the cases 12.

Two lifting heads, each suitable for uncasing one case, are shown. It is to be understood that any suitable number of lifting heads may be accommodated in transfer apparatus of the present invention.

The lifting heads are mounted on parallel bars 20. The bars 20 are connected to a mechanism which moves the bars generally in the direction of the arrows shown in FIGS. 1A and 4A. That mechanism is conventional and may be of the type shown in U.S. Pat. No. 3,555,770. Its function is to lower the lifting heads to drop the gripping devices 21 into a case wherein they grasp the bottles contained within the case. Thereafter, the lifting heads are raised, moved transversely across from the case conveyor to the bottle conveyor and thereafter lowered to deposit the bottles on the bottle conveyor 11. That path of movement is shown generally by the arrows 22. Variation in the precise path of movement can be made without departing from the scope of the present invention.

As will be described below, and as appears from FIGS. 1 through 4, each lifting head includes two plates 24, 25 which are first moved apart from one another (FIG. 2) and then a first plate is rotated through 90° (FIG. 2). The other plate is then rotated through 90° (FIG. 3), and with the plates thus rotated through 90° the bottles are deposited on the bottle conveyor as shown in FIGS. 4 and 4A with their axes rotated through 90°.

The lifting head mechanism is as shown in FIGS. 5-7. Parallel bars 20 are fixed on end plates 26, the end plates carrying an elongated plate 27 which extends the length of the transfer apparatus. The longitudinal bars carry a plurality of lifting heads 13, only one being shown, the others being identical or substantially identical to the lifting head 13. Each lifting head includes two rotating plates 24, 25 to which pneumatically-operated gripping devices 21 are mounted.

Plate 24 is carried by a plate 30 which is slidably mounted on longitudinal bars 20 by three bearing blocks 31. A cylinder 32 has one end fixed to the end plate 26 and has a piston and rod 33 projecting from the other end and connected to the slidable plate 30, the piston and cylinder 32, 33 of a double-acting type adapted to cause the sliding plate 30 to move between the positions shown in FIGS. 5 and 6.

The elongated plate 27 which overlies the lifting heads has a slot 34 through which a tube 35 passes (FIG. 7). The tube 35 has a nipple 36 by which it is connected to a pneumatic supply for operating the gripping devices. The tube 35 is connected to a hollow pivot shaft 40 whose lower end has a flange 41 to which the plate 24 is bolted by bolts 42. The shaft 40 and, hence, the plate 24 are rotatably mounted with respect to the plate 30 by a pair of bearings 43 and 44 which are separated by a sleeve 45 which contacts the inner races of the bearings 43, 44. The outer races are secured in upper and lower bearing blocks which are in turn fixed to the plate 30. A nut 48 threaded on the upper end of the shaft 40 ties the assembly together.

A crank arm 50 is fixed to the sleeve 45 so that when the crank arm 50 is rotated through an angle 90° it will carry with it the shaft 40 and lifting plate 24. The crank arm has its end pivotally connected to a piston rod 52 mounted in a double-acting cylinder 53 which is pivoted at 54 to the slidable plate 30 and is operable to rotate the lifting plate 24 between the positions of FIGS. 5 and 6. An air valve 55 is engageable by the crank arm 50 to form part of the control means for the sequencing of the operations.

The lifting plate 25 which carries the bottles in the other half of the case is mounted in similar fashion to a plate 60. The plate 60 is fixed on the bars 20 by means of two blocks 61 and set screws 62. A cross bar 63 is also fixed by set screws 64 to the elongated bars 20 to brace the structure. The lifting plate 25 is mounted for rotation to the fixed plate 60 by a mechanism substantially identical to that described in connection with the lifting plate 24 and as shown in FIG. 7. A similar piston rod 65 is connected to a crank arm 66, the piston rod being slidable in a double-acting cylinder 67 which is pivoted at 68 to the fixed plate 60. An air valve 69, also forming part of the control means, is also mounted on the fixed plate 60 and is engageable by the crank arm 66 for the purpose of sequencing the operation of the mechanism.

The whole assembly is supported on vertical rods 70 which are connected at their lower ends to blocks 71 mounted on elongated plate 27. The other ends of the bars 70 are connected to transfer mechanism not shown.

In operation, let it be assumed that the start position is with the apparatus slightly lower than is shown in FIG. 1 with the gripping device 21 in engagement with the bottles 15. Air is applied through the tubes 35 to the gripping devices to grip a full pattern of bottles.

A limit switch (not shown) is tripped, causing the transfer mechanism to rise. At approximately the same time, a valve is operated to introduce air into the cylinder 32 of lifting head 13 to cause the slidable plate 30 to move to the left as shown in FIG. 6. Similar but mirror operations are also occurring on the associated lifting head 14 as shown in FIGS. 1 and 2. At approximately this time, air is introduced to the cylinder 67 to cause the lifting plate 25 to rotate with respect to the fixed plate 60 as shown in FIG. 2. When the inner two lifting plates of heads 13 and 14 have completed their 90° rotation, their crank arms 66 will trip the air valve 69 which will admit air to cylinder 53 causing the opposite gripping plates 24 on the sliding plate 30 to rotate through 90°. The gripping plates 24, 25 thus assume the attitude as shown in FIG. 6 wherein they have rotated through 90° and change the orientation of the bottles which they carry. During this time, the transfer apparatus has been in motion to carry the lifting heads to a position overlying the bottle conveyor 11. When the carriage which carries the bars 20 and associated lifting heads reaches a position overlying the bottle conveyor, with the lifting heads oriented in the position shown in FIG. 6 and FIG. 4, the carriage is lowered and the air to the lifting heads is released permitting the bottles to be deposited on the conveyor.

The carriage then starts back to the case conveyor and trips a limit switch which oprates air valves to the gripping plates 24 causing the gripping plates to rotate through 90°. When the lifting plates 24 have rotated through 90°, each will trip the air valve 55 causing the opposite lifting plates 25 to rotate and also reversing the air to cylinder 32 to cause the slidable plate 30 to return to its original position. When the carriage moves to a pick-up position, the cycle starts over again to transfer bottles which have been carried into the apparatus by the case indexing mechanism.

As expressed above, the invention has been described in connection with the shifting of oval-shaped bottles from a case conveyor to a bottle conveyor. It will be appreciated that the invention, involving the gripping plates which split apart and thereafter rotate is applicable to the transfer of any type of article between any first station and any second station without departing from the scope of the invention.

Having described my invention, I claim:

1. Apparatus for handling articles comprising,
a support,
means for moving said support between first and second stations,
a first plate, a block fixing said plate against sliding movement on said support,
a second plate, a second block mounting said second plate for sliding movement on said support adjacent said first plate,
lifting plates mounted on said first and second plates, respectively, gripping devices mounted on said lifting plates,
first and second double-acting pistons and cylinders mounted between a respective first and second plate and its respective lifting plate for rotating each plate through 90°,
a third double-acting piston and cylinder mounted between said support and said second plate for sliding said second plate toward and away from said first plate, and control means for operating said pistons and cylinders in the following sequence as said support moves between said stations, (a) fluid to said third cylinder to move said second plate laterally away from said first plate, (b) fluid to said second cylinder to rotate the lifting plate mounted on said second plate, and (c) fluid to said first cylinder to rotate the lifting plate mounted on said first plate.

2. In apparatus including an elongated case conveyor, an elongated bottle conveyor parallel to and spaced from said case conveyor, apparatus for removing from a single case oval-shaped bottles having axes in a horizontal plane which are perpendicular to said conveyors and depositing said bottles on said bottle conveyor with their axes parallel to said case conveyor comprising, a support movable between said case conveyor and said bottle conveyor, two lifting plates mounted side-by-side on said support, each lifting plate having a plurality of article gripping devices depending from it, the combined lifting devices of said two plates matching the pattern of bottles in a single case, means for moving said support to shift said plates from a position overlying said case conveyor to a position overlying said bottle conveyor, means for shifting at least one of said plates away from the other, means for rotating said plates through an angle of 90°, and control means for effecting the following motions as said support moves:

(a) spread said plates apart;

(b) rotate said plates 90°.

* * * * *